United States Patent [19]
Aubert et al.

[11] 3,943,756
[45] Mar. 16, 1976

[54] WALL INSPECTION DEVICE

[75] Inventors: Gilles Aubert, Orsay; Roger Lemoine, Ste Genevieve des Bois; Andre Maury, Orsay; Maurice Moulin, Palaiseau; Erik Tomachevsky, Paris, all of France

[73] Assignee: Commissariat a l'Energie Atomique, Paris, France

[22] Filed: Aug. 23, 1974

[21] Appl. No.: 499,954

[30] Foreign Application Priority Data
Aug. 27, 1973 France............................ 73.30930

[52] U.S. Cl............................................. 73/67.8 S
[51] Int. Cl.[2].......................................... G01N 29/04
[58] Field of Search .......... 73/67.7, 67.8 S, 71.5 US

[56] References Cited
UNITED STATES PATENTS
3,780,571  12/1973  Wiesener........................ 73/67.8 S
3,809,607  5/1974  Murray et al................. 73/67.8 S X Primary Examiner—James J. Gill
Attorney, Agent, or Firm—Sughrue, Rothwell, Mion, Zinn & Macpeak

[57] ABSTRACT

The invention relates to a device for inspecting at a distance walls which are difficult of access such as metal walls forming a nuclear reactor vessel. The device comprises a detector secured to a slide movable along guide rails attached to a frame. Probes bearing on the metal walls are secured to a plate on the frame, each probe transmitting a signal proportional to the distance between the guide rails and the place where the probe bears on the part of the wall to be checked. The device includes two motors secured to a second frame and which are controlled by electrical signals from the probes. Each motor actuates a pinion engaging the racks secured by pivots to the first frame and the two ends of the guide rails. A potentiometric monitoring device stops the motors when the signals proportional to the distance between the wall and guide rails as measured by the probes are equal to one another and to a controlled value. The detector preferably comprises an assembly of transducers and ultrasonic receivers.

12 Claims, 7 Drawing Figures

WALL INSPECTION DEVICE

The invention relates to a device for inspecting at a distance walls which are difficult of access, for example, the metal walls forming a nuclear reactor vessel. The inspection of such a vessel is made when the reactor has stopped operating and the vessel is filled with water so as to eliminate the danger of radiation and the risk of contaminating the atmosphere.

As is known, the walls forming a reactor vessel are difficult of access because they are strongly contaminated by radioactive products; the metal walls are welded to one another to form the reactor vessel assembly and must be completely inspected after the reactor has been operating for a certain time, e.g. a few years. It is extremely difficult to inspect the reactor vessel, since it has to be inspected from a distance, the vessel must be filled with water during the inspections (which are called "in-service" inspections), the detectors and the devices for moving them may also become severely contaminated, and a variety of different checks have to be made on welds and threading and for cracks.

The detectors (i.e. transducers and ultrasonic receivers in the present case) used for inspecting the inner walls of reactor vessels should be positionable in a number of places all the way along the reactor vessel, which is several meters high and several meters in diameter, but should always be extremely accurately positioned. They must also be controlled at a distance through a depth of several meters of water. The known prior art devices cannot be used to guide the ultrasonic detectors so as to ensure that they are absolutely parallel to the metal walls which are to be inspected. This disadvantage is serious in the case of large reactor vessels, since it is impossible to ensure that the different welds connecting different parts of the reactor vessel maintain the components in an exact position relative to one another, e.g. with regard to lateral pitting; when ultrasonic transducers are used for an inspection, they have to be positioned with greater accuracy then the accuracy which is obtained after welding various large metal components, more particularly in view of the large lever arms resulting from the size of the vessel.

Furthermore, there is no prior art measuring system for simultaneously monitoring the top surface of the flange, the reactor vessel, the lateral pits, and the cylindrical and hemispherical walls of the vessel.

The invention relates to a device for inspecting at a distance walls which are different of access, for example for inspecting cracks, threaded apertures and welds in the walls, characterized in that it comprises a detector secured on a movable slide, guide rails secured to a frame $B_1$ along which the slide moves, probes bearing on the metal wall and secured to a plate secured to frame $B_1$ and parallel to the guide rails, each probe sending a signal proportional to the distance between the guide rails and the place where the probe bears on the wall to be checked, two motors $M_1$ and $M_2$ secured to a frame $B_2$ controlled by electric signals from the probes and each actuating a pinion, the pinions engaging racks secured by pivots to frame $B_1$ at the two ends of the guide rails, and a potentiometric monitoring device which stops the motors when the signals proportional to the distance between the wall and the guide rails and measured by the probes are equal to one another and to a control value.

The detectors used for in-service inspection of a nuclear reactor comprise an assembly of ultrasonic transducers.

Irrespective of the position of the slide bearing the ultrasonic transducers, the two probes ensure that the two rails are parallel to a generatrix of the surface of the metal wall which is to be inspected; during its movement, therefore, the slide maintains the transducers at a constant, adjustable distance from the reactor vessel wall. The two motors $M_1$ and $M_2$ associated with distance coders are insulated by seals from the contaminated water in the reactor vessel.

According to the invention, the movement of the transducer-bearing slide along a line parallel to the metal wall is controlled by an immersible automatic reduction-gear assembly $M_3$ containing a coder and secured to frame $B_1$, the motor rotating an endless screw parallel to the rails on which a nut comprising ball bearings is placed, the nut being secured to the slide and the slide being guided by the guide rails.

The invention also relates to a device for examining welds inside pits on the reactor core, comprising a centring star having three retractable arms and secured to frame $B_2$ by a bearing, the arms being disposed parallel to the axis of symmetry of the chimney formed by the pit and the ends of the arms bearing on the inner wall of the chimney, and a motor $M_4$ on a frame $B_3$ rotates frames $B_1$ and $B_2$ around an axis parallel to the wall to be checked and near the axis of symmetry of the chimney, by rotating a pinion engaging a toothed rim $C_1$ secured to frame $B_2$. The pit-inspecting device also comprises a slide to which frame $B_3$ is secured and which can move in a direction parallel to the axis of rotation of frames $B_1$ and $B_2$, a motor and reduction gear assembly comprising a coder $M_5$ secured to the slide and rotating a pinion engaging a rack secured to a frame $B_4$, a toothed rim $C_2$ secured to a frame $B_5$, a pinion actuated by a motor $M_6$ and engaging rim $C_2$, motor $M_6$ being secured to frame $B_4$, and a nut and screw system for securing frame $B_5$ to a horizontal flange H secured to a vertical bearing mast M whose axis of symmetry coincides with the axis of symmetry A of the reactor vessel.

If, during stepwise rotation controlled by motor $M_4$, the actual distance between the transducers and the metal wall deviates from a preset value, motors $M_1$ and $M_2$ immediately return the rail to the correct position. After each rotation step, before the transducers are moved parallel to the generatrix of the pit wall, a check is made using the probes to see that the guide rails are exactly parallel to the generatrix. The probes are provided with rollers so that they remain in contact with the wall when the assembly rotates around the axis of symmetry of the pit. The retractable three-armed star is used to dispose the axis of symmetry of the device at approximately the same position as the pit axis and prevent the numerous reversals in the direction of the transducer-bearing slide from producing vibrations impairing the accuracy of the checks. When the device is inserted into the pit, springs retain the three star arms in a retracted position, and when the device is inserted a pressure fluid is introduced so as to compress the spring holding the three arms and so that the arms extend simultaneously. The pressure fluid circuit is separated by a system of seals from the contaminated water in the reactor vessel. The fluid used may be water having the same characteristics as the water in the vessel.

Since the axis of the arm formed by frames $B_1$ and $B_2$ is always in the same direction even if it is not identical with the actual pit axis, the position of the transducer-bearing slide with respect to the wall is exactly reproducible since it is regulated with respect to the wall (except of course in the unlikely case when the wall is deformed).

The pit inspecting device, like the rest of the device according to the invention, is given dynamic stability by reducing the masses in motion, i.e. the mass of the transducer-bearing slide and the mass of the slide-bearing head rotating around the pit axis of symmetry. The various motors and electric or pressure control ducts are insulated from the contaminated liquid and kept under a neutral gas, e.g. nitrogen, at slight excess pressure. The surface of the components in contact with the vessel, i.e. the bearings of the star arms and the ends of the probes, are made of material having a hardness and chemical characteristics which are compatible with the core lining.

In order to examine welds in the cylindrical part of the reactor vessel, the device according to the invention comprises a frame on which motors similar to $M_1$ and $M_2$ are secured, the frame being driven by a motor $M_7$ secured to frame $B_2$ along a guide ring secured to a frame $B_6$; a toothed rim $C_3$ secured to frame $B_6$ engaging a pinion driven by motor $M_7$, a centering star having three retractable arms welded to frame $B_6$, the axes of symmetry of frame $B_6$, the three-arm star, the guide ring and the toothed rim $C_3$ coinciding with the axis of symmetry A of the reactor core, and a nut and screw securing system to flange H secured to a vertical bearing mast M.

Since the welds to be checked are several meters away from the mast, the head bearing the pit inspection device is stabilised by the bearing and centring star at the end of mast M on flange H. The star has three retractable arms which move in identical manner.

The device according to the invention used for examining welds in the hemispherical part of the bottom of a nuclear reactor core is characterised in that the transducer-bearing slide moves along guide rails whose radius of curvature is equal to the radius of curvature of the hemisphere forming the bottom of the reactor; the device comprises a motor and reduction gear assembly $M_8$ driving a pinion secured to the slide and engaging a circular sector of a rack secured to a frame $B_7$; a frame $B_8$ to which motors of a kind similar to $M_1$ and $M_2$ are secured and which is rotated around the axis of symmetry A by a motor $M_9$ actuating a pinion engaging a toothed rim $C_4$ secured to a frame $B_9$ comprising a centring star having three retractable arms; and a nut and screw securing system to the horizontal flange H of the mast, the axes of symmetry of frame $B_9$ rim $C_4$ and of the three-armed star coinciding with the axis of symmetry A of the reactor core.

It is difficult to check the hemispherical part forming the base of the reactor vessel since the welds are on parallel lines on a sphere and affect plates having different thicknesses, and the inner surface of the vessel has rough portions produced by the lower bearings for the internal accessories and the instrumentation tubes. Accordingly, in order to prevent damage to the transducers, the wall has to be monitored from a considerable distance. The monitoring head used for examining the hemispherical part of the vessel is based on the previously mentioned head for examining the cylindrical walls of the vessel but differs therefrom in that the guide track formed by two rails is arcuate instead of straight. The transducer-bearing slide is driven by a pinion and toothed wheel engaging two guide arcs concentric with the meridian line of the bottom. The two probes maintain frame $B_7$ at a greater distance from the inner wall of the vessel than is maintained by the two probes used for observing the cylindrical part of the same wall. The three-armed centring star has the same features as in the device for observing and inspecting the cylindrical walls of the vessel.

The device according to the invention also comprises a motor $M_{10}$ secured to a triangular base comprising a cylindrical shaft for guiding the mast, the motor $M_{10}$ driving a pinion engaging a rack secured along a generatrix of the mast, the device also comprising a mechanism for automatic locking at the level corresponding to the welds to be checked.

The triangular base is secured to the vessel flange. The arms and cross-pieces forming the base are demountable so that the entire assembly can be conveyed through the "personnel lock" leading to the nuclear reactor. To reduce clearances to a minimum, the demountable elements are adjusted with respect to one another by centring studs and are secured together by non-detachable bolts. The cylindrical mast is also made up of a number of elements which can all be inserted through the personnel lock and which are adjusted to one another by centring studs and secured by non-detachable bolts. The rack, which is secured along a generatrix, engages the pinion of the lifting mechanism; the rack is held in position by a longitudinal guide system; the mast terminates at the bottom in a securing flange H on which the various monitoring heads are secured by nut and screw systems.

According to the invention, the triangular base comprises four bearings or bed-plates made of stainless steel and bearing on a flange at the top of the reactor core, a demountable tubular frame, and three guide lugs guided in uprights screwed to the top of the vessel.

The invention also relates to a device for monitoring the collar at the top of the vessel and threaded apertures therein, characterised in that it comprises a frame $B_{10}$ secured by a rotary bearing to a frame $B_{11}$ screwed to the horizontal flange H of the vertical bearing mast, a motor $M_{11}$ secured to frame $B_{10}$ driving a pinion engaging a toothed rim secured to frame $B_{11}$, a horizontal flip-flop secured to frame $B_{10}$ by a spring and pivot system and bearing on the inner flange at the periphery or at the top of the reactor vessel, an assembly comprising a motor $M_{12}$, rack and pinion secured to the flip-flop and moving forward an arm bearing transducers, and an assembly comprising a motor $M_{13}$ and a nut and screw secured to the end of the arm bearing the transducers and adapted to pivot a transducer head for improving the efficiency with which the bottom parts of the threads are explored.

According to the invention, a movable slide conveying a transducer in a direction parallel to the vertical generatrices of the cylinders forming the reactor vessel is disposed on frame $B_{10}$ in a prolongation of the previously-described device, the slide being moved by a system comprising a motor $M_3$, a nut, a screw and guide rails secured to a frame $B_{12}$, and a probe bearing on the vessel wall is secured to frame $B_{12}$ and controls a motor $M_{14}$ which simultaneously drives two pinions engaging two racks perpendicular to the vessel wall and secured to frame $B_{12}$ via pivots bearing the slide, motor $M_{14}$ being secured to frame $B_{10}$.

The aforementioned two checks on the top part of the reactor vessel can be made when the reactor core and the devices attached thereto are inside the vessel.

In all the devices according to the invention, the motors and the output of the centring star arms are controlled at a distance via ducts which are isolated from the water in the reactor vessel and are disposed in a neutral gas atmosphere, e.g. nitrogen.

All the nut and screw assemblies comprise nondetachable bolts, which cannot therefore drop inside the reactor vessel or core, if the latter is in position during the inspection, and cause serious damage. All the motor assemblies from $M_3$ to $M_{13}$ are provided with coders which transmit the position of the motors via flexible wires to a display device. The coders are not necessary for the operations for correcting the approach of motors $N_1$, $M_2$ and $M_{14}$, but they may be provided. All the motors and other devices are insulated by seals from the water in the reactor.

The invention will be more clearly understood from the following description of a non-limitative embodiment referring to the accompanying drawings in which.

As already stated, the invention comprises an improved system for accurately observing the various weak points inside a reactor vessel, using a number of movable inspection heads disposed on a single central mast moving downwards, the heads being provided with high-precision probes for adjusting the transducers parallel to the generatrices of the surfaces to be observed.

Figure 1:
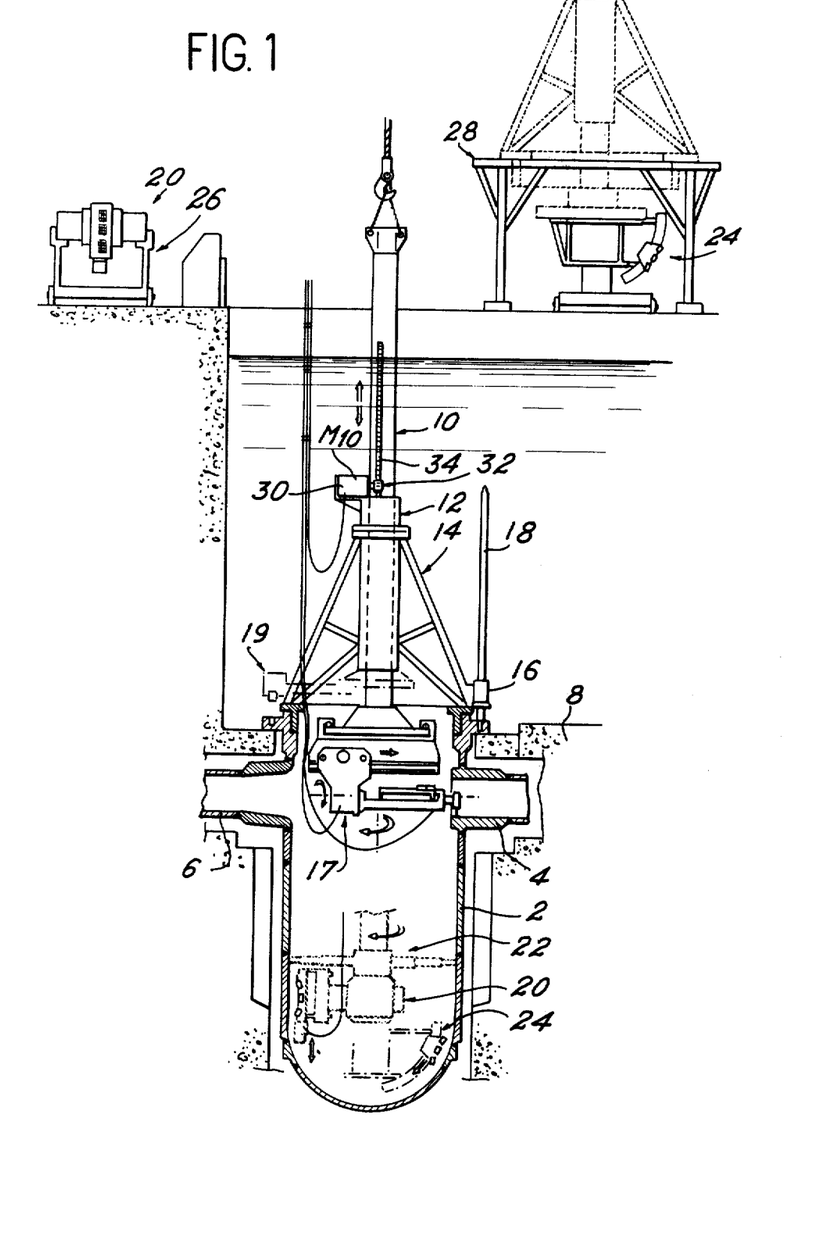
FIG. 1 is a general diagram of the device, when secured to the vessel with the various inspection heads in position.

FIG. 1 is a general diagram of the various devices according to the invention, showing two of the tripods used for storing various components when they are not used. A reactor core 2 has lateral pitting arms 4 and 6, the vessel being surrounded by a concrete wall 8. A mast 10 slides in a chimney 12 forming part of a triangular base 14 provided with chimneys 16 threaded in uprights 18 secured to the top part of the reactor vessel. The drawing shows a device 17 for inspecting pits in the vessel, the device being disposed on the main mast. The chain-dotted line at 19 indicates the device used for observing threads on the top part of the reactor vessel flange; reference 20 denotes a part of the mast and a device for inspecting the cylindrical walls of the vessel, comprising a centring star 22, and reference 24 denotes a device used to inspect welds in the hemispherical part forming the bottom of the reactor vessel. A tripod 26 bears a device 20 for observing the walls of the reactor vessel. An assembly 28 is used to bear the triangular assembly and the device 24 for observing the bottom of the hemispherical vessel, when device 24 is not used. A motor $M_{10}$ at 30 actuates a pinion 32 engaging a rack 34 so as to raise or lower the mast for inspecting welds at different depths in the reactor vessel.

Figures 2, 2A:
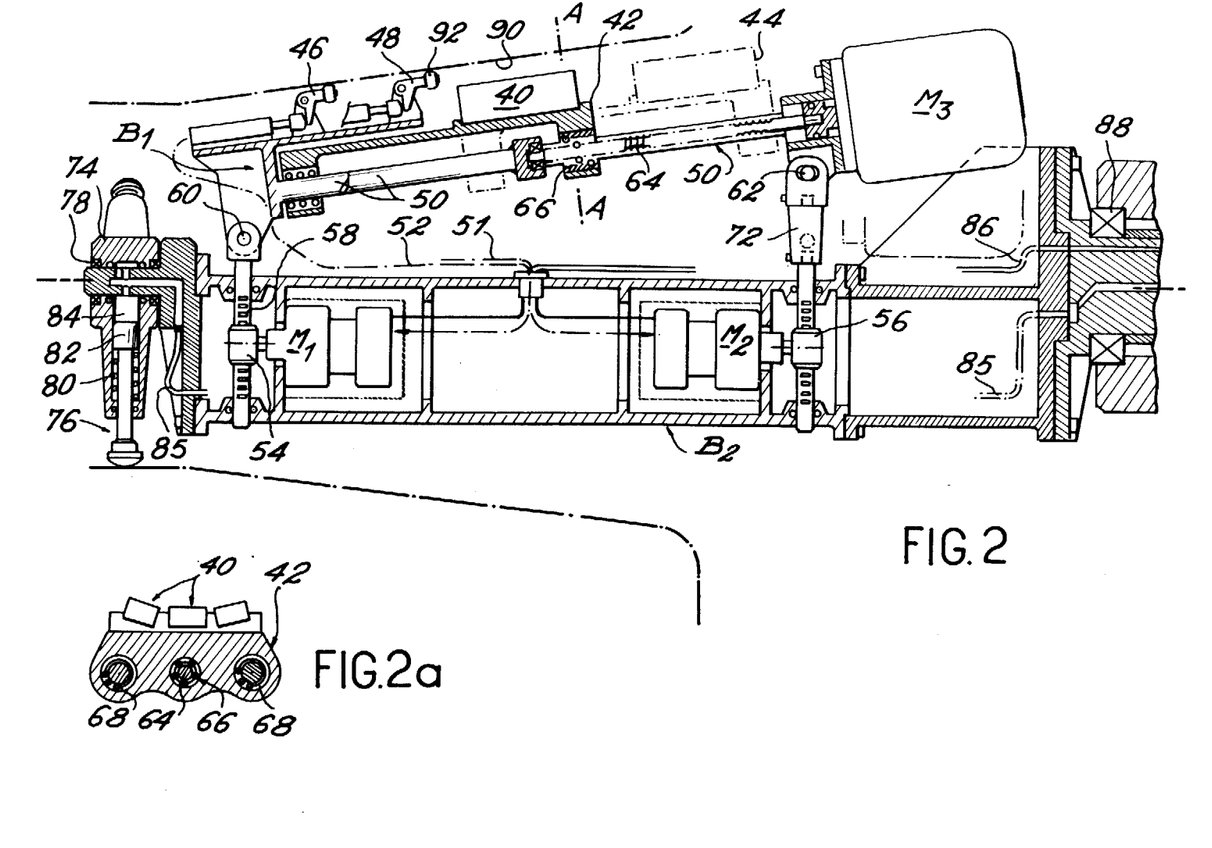
FIG. 2 diagrammatically shows part of the inspection device inside lateral pits.
FIG. 2A is a cross-section taken along line A—A of the slide-guiding device in FIG. 2.

FIG. 2 diagrammatically shows the device for moving the transducers used in the lateral pitting arms for observing welds, the diagram more particularly showing the device for moving the transducers towards and guiding them parallel to the surface to be inspected. The transducers 40 rest on a movable slide 42, the transducer system being adapted to move as far as the chaindotted position shown at 44. Probes 46, 48 convey electric signals proportional to the distance between their point of contact and guide rails such as 50 to motors $M_1$ and $M_2$ via two insulated flexible connections 51, 52. Motors $M_1$, $M_2$ actuate pinions 54, 56 engaging on racks such as 58 secured by pivots 60, 62 to frame $B_1$. Frame $B_2$ comprises motors $M_1$, $M_2$ and the pinions attached thereto. Motor $M_3$ rotates an endless screw 64 to which a nut 66 comprising ball bearings is secured and is also secured to the transducer. The cross-section in FIG. 2A is a side view of the slide bearing the transducers, showing the ball bearings surrounding the guide rails at 68 and the nut comprising ball bearings 66 secured to the endless screw 64. An additional plate 72 is used to guide frame $B_1$ along the pit wall so as to inspect the frusto-conical part of the pits. A centring star 74 having three arms such as 76 is secured to frame $B_2$ by bearings such as 78. The output of the star arms forming the centring device is controlled via springs such as 80 in compression and a fluid acting on pistons such as 82 connected to and extending the arms of the star. The pressure fluid is conveyed to chamber 84 via flexible insulated pipes such as 85. Motors $M_1$, $M_2$ and $M_3$ are energised and electrically controlled via an insulated flexible wire 86. A second rotary bearing for frame $B_2$ is shown at 88. A part of the inner wall of the pit is shown at 90. Probes 46, 48 are provided with rollers such as 92 at their ends.

Figure 3:
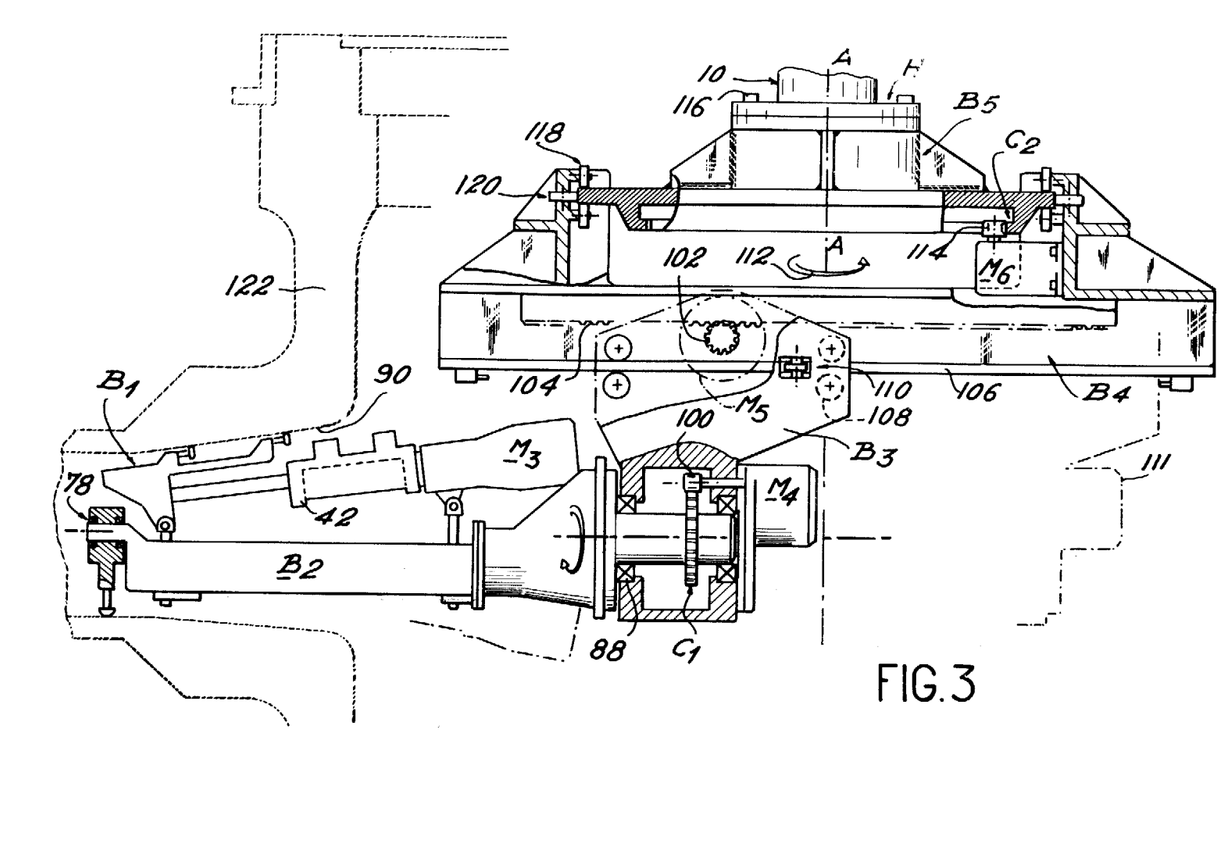
FIG. 3 is a general diagram of the device used for moving the transducers inside the pitting arm.

FIG. 3 is a partial cross-section of part of the device used for moving the inspection arms inside the pits. The frame $B_2$ is supported by bearings 88 in frame $B_3$ and 78 and rotated by a pinion 100 actuated by a motor $M_4$ rotating pinion 100 which engages a toothed wheel $C_1$ secured to frame $B_2$. Motor $M_4$ is secured to frame $B_3$ which is horizontally driven by a motor $M_5$ (not shown) driving a pinion 102 engaging a rack 104. Frame $B_3$ is guided by rails 106 via rollers such as 108 and 110. Rack 104 is secured to frame $B_5$. The end position of frame $B_3$ is shown in chain-dotted lines at 111. Frame $B_4$ rotates around the axis of symmetry A of the vessel in the direction of arrow 112, under the action of a motor $M_6$ driving pinion 114 engaging a toothed rim $C_2$ secured to a frame $B_5$ connected to mast 10 via flange H and a nut and screw system 116. The rotation of frame $B_4$ is guided by a system of rollers such as 118 and 120. The metal walls forming the reactor vessel are denoted by 122.

Figure 4:
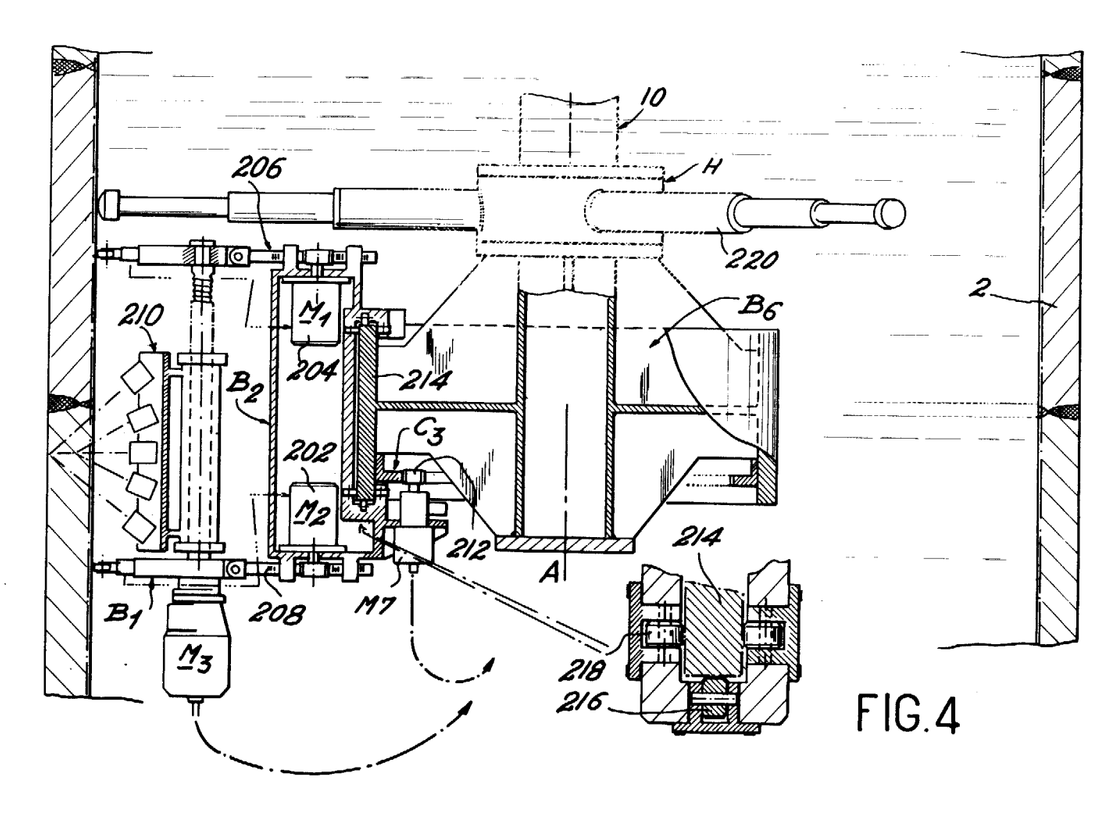
FIG. 4 is a diagram of the device used to observe welds on the cylindrical part of the vessel.

FIG. 4 shows the system for inspecting welds on the cylindrical part of the reactor vessel. Frame $B_2$ comprises motors $M_1$ and $M_2$ at 202 and 204, which drive racks 206 and 208. The transducer unit is shown at 210. Frame $B_2$ is rotated around the axis of symmetry A by a motor $M_7$ driving a pinion 212 engaging a toothed wheel $C_3$ secured to a frame $B_6$. Rotation occurs along a cylindrical guide ring 214 provided with rollers, as can be seen in greater detail in the partial cross-section representing part of the ring 214, the bearing roller 216 and the guide roller 218. A star having three retracttable arms is shown at 220; it is secured to frame $B_6$. Frame $B_6$ is secured by a nut and screw system to the horizontal flange H secured to mast 10.

Figure 5:
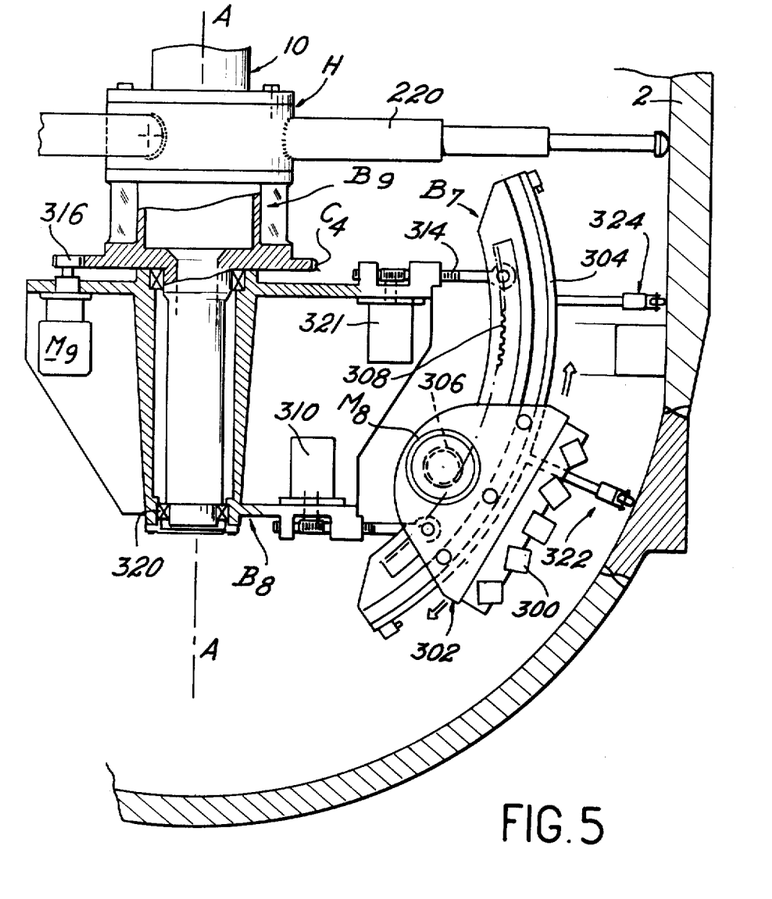
FIG. 5 diagrammatically shows the device for inspecting the hemispherical part of the reactor vessel.

FIG. 5 shows as inspection device used for examining welds in the hemispherical part of the bottom of the reactor vessel. The transducers are disposed at 300 on a movable slide 302 moving along guide rails such as 304. A motor $M_8$ drives a pinion 306 engaging a rack 308 secured to frame $B_7$. Frame $B_8$ bears motors $M_1$ and $M_2$ at 310 and 321, driving racks such as 314. Frame $B_8$ is rotated around the axis of symmetry A by a motor $M_9$ driving a pinion 316 engaging a toothed wheel $C_4$ secured to a frame $B_9$. A centring star 200 is secured to frame $B_9$, which is secured to mast 10 by a nut and screw system co-operating with the horizontal flange H secured to the mast. Frame $B_8$ is rotated around axis A by rotary bearings such as 320. The probes are shown at 322 and 324.

Figure 6:
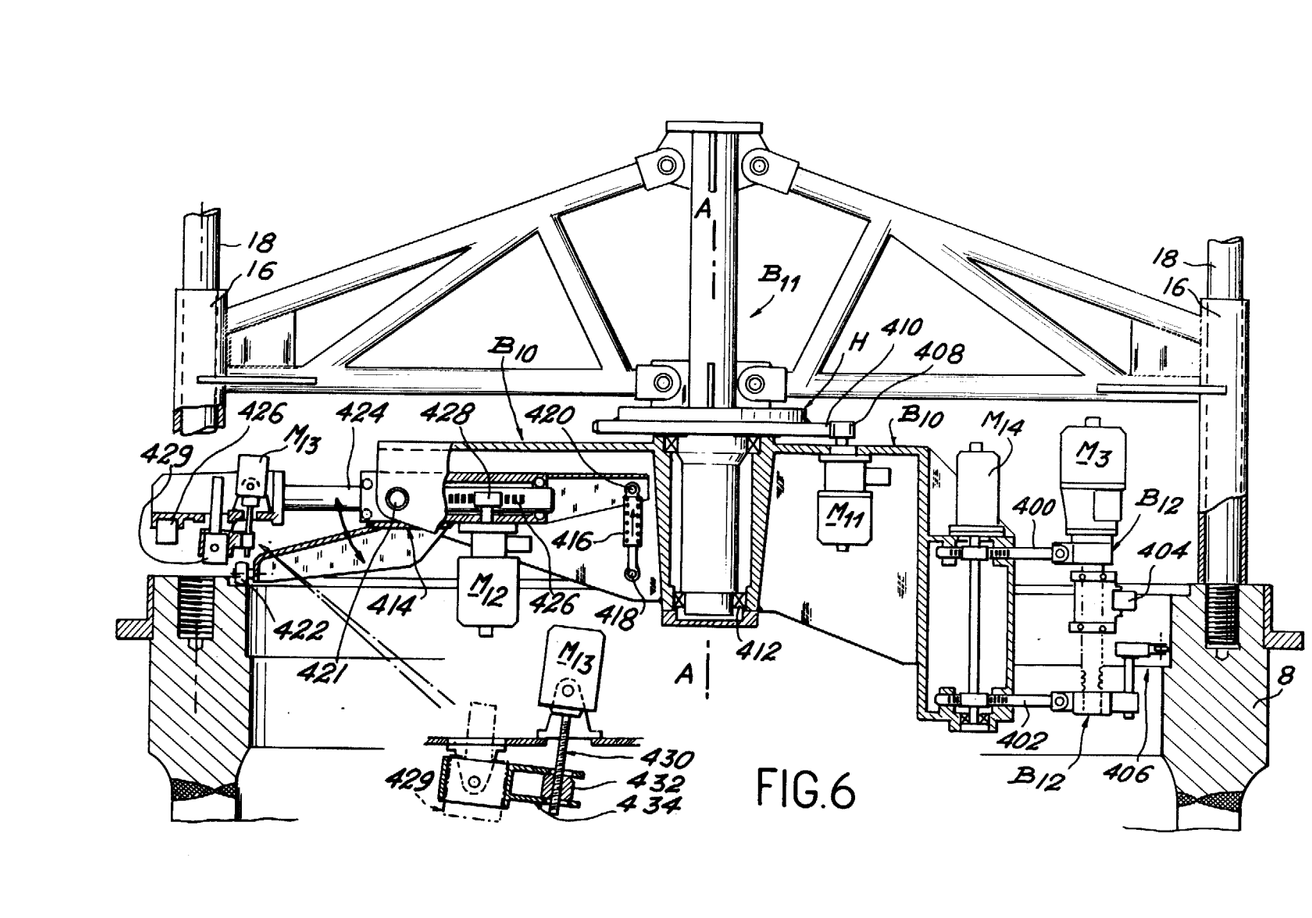
FIG. 6 diagrammatically shows the device for inspecting the top of the reactor vessel.

FIG. 6 shows a system for observing threads, cracks and the top collar of the reactor vessel. A frame $B_{10}$ bears a motor $M_{14}$ actuating racks 400 and 402 which determine the horizontal position of a transducer disposed at 404; a single probe 406 is used. Motor $M_{11}$ rotates a pinion 408 which engages a toothed wheel 410 secured to a frame $B_{11}$. The motor, pinion and toothed rim system rotate the device secured to frame $B_{10}$ around axis A. Rotation is produced via rotary bearings such as 412. A flip-flop 414 is secured to the other end of frame $B_{10}$ and connected thereto by a spring system shown at 416 and pivoted at 418 and 420. The flip-flop pivots around shaft 421. The flip-flop bears via a wheel 422 on a rim at the top periphery of the tank. The flip-flop has an arm 424 provided with a rack 426 and an assembly comprising a pinion and a motor $M_{12}$, pinion 428 moving arm 424 backwards or forwards. A stationary transducer 426' and a movable transducer 429 are disposed at the end of arm 424. An enlarged diagram of the system for pivoting transducer 429 is shown in cross-section; a motor $M_{13}$ rotates an endless screw 430 in a nut 432 secured by an arm 434 provided with a locking ring gripping the transducer. Motor $M_{13}$ is secured to the flip-flop arm.

Of course, the invention is not limited to the embodiments shown and described by way of example; it should be understood that the scope of the present patent extends to equivalent variants, inter alia relating to the driving and rotating means, which can comprise pneumatic or hydraulic jack control means instead of electric motors as in the description.

We claim:

1. A device for inspecting at a distance walls which are difficult of access, the device being used inter alia for inspecting cracks, threaded apertures and welds in the walls of a nuclear reactor vessel comprising a detector secured on a movable slide, guide rails secured to a frame $B_1$ along which the slide moves, probes bearing on a wall being inspected and secured to a plate secured to frame $B_1$ and parallel to the guide rails, each probe sending a signal proportional to the distance between the guide rails and the place where the probe bears on the wall to be checked, two motors $M_1$ and $M_2$ secured to a frame $B_2$ controlled by electric signals from the probes and each actuating a pinion, the pinions engaging racks secured by pivots to frame $B_1$ to the two ends of the guide rails, and a potentiometric monitoring device which stops the motors when the signals proportional to the distance between the wall and the guide rails and measured by the probes are equal to one another and to a control valve.

2. A device according to claim 1, comprising a detector made of an assembly of transducers and ultrasonic receivers.

3. A device according to claim 2 in which the movement of the transducer-bearing slide in a direction parallel to the metal wall is controlled by a motor and reduction gear assembly $M_3$ containing a coder and secured to frame $B_1$, the motor rotating an endless screw on which a nut comprising ball bearings is disposed and is secured to the slide.

4. A device according to claim 3 for examining welds inside pits in a nuclear reactor vessel, comprising a centring star having three retractable arms secured to frame $B_2$ by a bearing, the arms being disposed perpendicular to the axis of symmetry of the chimney formed by the pit and the ends of the arms bearing on the inner wall of the chimney, and a motor $M_4$ disposed on a frame $B_3$ rotating frame $B_1$ and $B_2$ around an axis coinciding with the axis of symmetry of the chimney, by rotating a pinion engaging a toothed rim $C_1$ secured to the frame $B_2$.

5. A device according to claim 4, comprising a slide on which the frame $B_3$ is secured, the slide being movable in a direction parallel to the axis of symmetry of the pits; a motor and reduction gear assembly comprising a coder $M_5$ secured to the slide and rotating a pinion which engages a rack secured to a frame $B_4$, a toothed rim $C_2$ secured to a frame $B_5$, a pinion driven by a motor $M_6$ and engaging the rim $C_2$, the motor $M_6$ being secured to the frame $B_4$, and a nut and screw system for securing the frame $B_5$ to a horizontal flange H secured to a vertical bearing mast whose axis of symmetry coincides with the axis of symmetry A of the reactor vessel.

6. A device according to claim 5 comprising a motor $M_{10}$ secured to a triangular base comprising a cylindrical shaft for guiding the mast, the motor $M_{10}$ driving a pinion engaging a rack secured along a generatrix of the mast, the device also comprising a mechanism for automatic locking at the level corresponding to the welds to be checked.

7. A device according to claim 6, in which the triangular base comprises four bearings or bed-plates made of stainless steel and bearing on a flange at the top of the reactor vessel, a demountable tubular frame, and three guide lugs guides in uprights screwed to the top of the vessel.

8. A device according to claim 3 for examining welds in the cylindrical part of a nuclear reactor vessel, comprising a frame on which motors are secured, the frame being driven by a motor $M_7$ secured to frame $B_2$ along a guide ring secured to a frame $B_6$ ; a toothed rim $C_3$ secured to frame $B_6$ engaging a pinion driven by motor $M_7$ , a centring star having three retractable arms welded to frame $B_6$, the axes of symmetry of frame $B_6$ , the three-arm star, the guide ring and the toothed rim $C_6$ coinciding with the axis of symmetry A of the reactor vessel, and a nut and screw securing system to flange H secured to a vertical bearing mast whose axis of symmetry likewise coincides with the axis A.

9. A device according to claim 3, for examining welds in the hemispherical part of the bottom of a nuclear reactor vessel, in which the slide bearing the transducers moves along guide rails parallel to the surface of the hemisphere, forming the bottom of the vessel, and comprising a motor and reduction gear assembly $M_8$ driving a pinion which is secured to the slide and engages a circular sector of a rack secured to a frame $B_7$, a frame $B_8$ on which motors are secured, and which is rotated around the axis of symmetry A by a motor $M_9$ driving a pinion which engages a toothed rim $C_4$ secured to a frame $B_9$ comprising a centring star having three retractable arms, and a nut and screw securing system to the horizontal flange A of the vertical bearing mast whose axis of symmetry coincides with the axis of symmetry A of the reactor vessel, the axes of symmetry of frame $B_9$, toothed rim $C_4$ and the three-armed star coinciding with the axis of symmetry A.

10. A device according to claim 1, further comprising extendable centering star arms attached to frame $B_2$ in which the motors and the centering star arms are remote-controlled by ducts insulated from the water in the reactor vesel, the ducts being placed in a neutral gas atmosphere.

11. A device for monitoring the collar at the top of a reactor vessel and threaded apertures therein, comprising a frame $B_{10}$ secured by a rotary bearing to a frame $B_{11}$ screwed to the horizontal flange H of a vertical bearing mast, a motor $M_{11}$ secured to frame $B_{10}$ driving a pinion engaging a toothed rim secured to frame $B_{11}$, a horizontal flip-flop secured to frame $B_{10}$ by a spring and pivot system and bearing on an inner flange at the periphery or at the top of the reactor vessel, an assembly comprising a motor $M_{12}$, rack and pinion secured to the flip-flop and moving forward an arm bearing transducers, and an assembly comprising a motor $M_{13}$ and a nut and screw secured to the end of the arm bearing the transducers and adapted to pivot a transducer head.

12. A device for observing an inner flange at the top of a reactor vessel, secured to a frame of a collar-checking device and in an extension thereof, comprising a movable slide conveying a transducer along a line parallel to the vertical generatrices of the cylinder forming the reactor vessel, the slide being driven by a system comprising a motor $M_3$, a screw, a nut and guide rails secured to a frame $B_{12}$, a probe bearing on the wall of the vessel and secured to frame $B_{12}$ and actuating a motor $M_4$ which simultaneously drives two pinions engaging two racks perpendicular to the vessel wall and secured to frame $B_{12}$ by pivots and, the motor $M_4$ bearing the slide secured to the frame of the device for monitoring the collar.

* * * * *